United States Patent
Nayak et al.

(10) Patent No.: US 9,122,288 B1
(45) Date of Patent: Sep. 1, 2015

(54) LOW POWER USB 2.0 SUBSYSTEM

(75) Inventors: Anup Nayak, Fremont, CA (US); Nicholas Bodnaruk, Sunnyvale, CA (US); Derwin Mattos, San Mateo, CA (US); Shailja Garg, Fremont, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 604 days.

(21) Appl. No.: 13/337,438

(22) Filed: Dec. 27, 2011

Related U.S. Application Data (60) Provisional application No. 61/512,346, filed on Jul. 27, 2011.

(51) Int. Cl.
  *G05F 1/10* (2006.01)
  *G05F 1/577* (2006.01)
  *G06F 1/26* (2006.01)
  *H02J 7/00* (2006.01)

(52) U.S. Cl.
  CPC . *G05F 1/10* (2013.01); *G05F 1/577* (2013.01); *G06F 1/26* (2013.01); *G06F 1/266* (2013.01); *H02J 7/0031* (2013.01)

(58) Field of Classification Search
  CPC ............ G05F 1/10; G05F 1/577; G06F 1/26; G06F 1/266; H02J 7/0031
  USPC ........................................................ 713/300
  See application file for complete search history.

(56) References Cited

U.S. PATENT DOCUMENTS

| | | | |
|---|---|---|---|
| 5,774,813 A * | 6/1998 | Jokinen | 455/574 |
| 6,541,879 B1 | 4/2003 | Wright | |
| 6,654,264 B2 * | 11/2003 | Rose | 363/65 |
| 6,865,682 B1 | 3/2005 | Talbot et al. | |
| 7,000,123 B2 | 2/2006 | Mariaud et al. | |
| 7,138,854 B2 | 11/2006 | Messager | |
| 7,644,217 B2 | 1/2010 | Butler et al. | |
| 2004/0257151 A1 * | 12/2004 | Chan et al. | 327/540 |
| 2006/0041770 A1 * | 2/2006 | Lougee | 713/340 |
| 2006/0261788 A1 * | 11/2006 | May | 323/273 |
| 2007/0290555 A1 | 12/2007 | Caren | |
| 2009/0326905 A1 | 12/2009 | Cao | |
| 2010/0064153 A1 * | 3/2010 | Gk et al. | 713/310 |
| 2011/0133709 A1 | 6/2011 | Mengad | |
| 2012/0126625 A1 * | 5/2012 | Maher et al. | 307/80 |
| 2012/0153908 A1 * | 6/2012 | Wu | 323/271 |

FOREIGN PATENT DOCUMENTS

| | | |
|---|---|---|
| CN | 2914449 y | 6/2007 |
| JP | 2010231795 A | 10/2010 |

OTHER PUBLICATIONS

Fairchild., USB1T1105A "Universal Serial Bus Peripheral Transceiver with Voltage Regulator" 12 pages.
SAF1760., "Hi-Speed Universal Serial Bus Host Controller for Embedded Applications" Product data sheet Rev.2-19 Jun. 2012.

* cited by examiner

*Primary Examiner* — Jaweed A Abbaszadeh
*Assistant Examiner* — Terrell Johnson (57) ABSTRACT

USB physical interface subsystems are provided that include a protection circuit including a power supply interface and a plurality of pin interfaces, a pin identifier circuit in communication with the protection circuit for detecting a device coupling to a pin connected to one pin interface of the plurality of pin interfaces, a USB physical interface, and a dual power supply regulator configured to receive power via the power supply interface, to continuously supply a first voltage to the protection circuit, and to provide a second voltage and a third voltage to the pin identifier circuit and the USB physical interface, the second voltage and the third voltage being switched outputs.

20 Claims, 5 Drawing Sheets

LOW POWER USB 2.0 SUBSYSTEM

RELATED APPLICATIONS

This application claims the priority benefits of U.S. Provisional Application No. 61/512,346, filed on Jul. 27, 2011, which is incorporated in its entirety by reference herein.

TECHNICAL FIELD

This disclosure relates to universal serial buses (USB), and in particular, to low power USB 2.0 physical interface subsystems.

BACKGROUND

The universal serial bus (USB) provides a low cost solution for attaching peripheral devices to a host, such as a host computer or host server, so that the peripheral devices and the host can communicate with each other. Devices that are attached to a USB bus are automatically detected, and software automatically configures the devices for immediate use typically without user intervention. The USB devices/peripherals may include devices such as printers, scanners, keyboards, a mouse, digital cameras, digital video cameras, data acquisition devices, modems, speakers, telephones or video phones, storage devices such as ZIP drives, or other peripherals or devices. A USB bus can be extended with a hub which permits additions peripherals, or other hubs, to be coupled to a USB bus.

The USB specification entitled "Universal Serial Bus Revision 2.0 Specification" available at www.usb.org, the disclosure of which is hereby incorporated by reference in its entirety, dictates various requirements and protocols for devices connected with a USB bus. For example, issues relating to power management are included in the USB specification. In particular, the USB specifications define that devices may be low power devices drawing up to 100 mA of power from the USB connection or high power devices drawing up to 500 mA of power from the USB connection.

Recently, several extensions were added to the USB specification including an "on the go" (OTG) feature. The OTG feature permits two USB devices coupled to one another to communicate without the presence of a host computer. Another extension was added to delineate protocol for dedicated battery chargers, use of USB host as battery chargers, and a "No Dead Battery" provision to allow USB devices to temporarily draw power during connection to each other. Several different configurations have been produced to integrate the aforementioned USB protocol extensions. However, the configurations either introduce additional external hardware, which increases board area, or do not operate independently off of a battery or other external power supply.

BRIEF DESCRIPTION OF THE DRAWINGS

The present disclosure is illustrated by way of example, and not by way of limitation, in the figures of the accompanying drawings.

DETAILED DESCRIPTION

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter, and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Embodiments described herein provide a USB 2.0 physical interface subsystem that is capable of operating from two independent high-voltage external supplies. The two independent external supplies are inputs to a sub-block called a regulator, which has multiple output voltages. One output voltage is supplied by an internal, standby sub-regulator to provide a continuous low power supply for various circuits, such as an electrostatic discharge (ESD) protection circuit for pin interfaces, during a standby power mode. The output voltage is shared with the output of an active regulator, which is configured to be powered on or off in response to a received control signal. When powered on, the active regulator provides high power voltage supply to various circuits in the subsystem, such as the physical layer interface. The active regulator is electrically coupled to another regulator capable of providing another output voltage to a physical layer interface in the subsystem. The other regulator can be powered on or off in response to another control signal. When powered on, the other regulator provides a portion of the received voltage from the active regulator to the physical layer interface.

Accordingly, by including various regulators, the subsystem can easily and safely switch between a low power or standby mode, an intermediate power mode, and a high power mode. Use of regulators that can be turned on and off via control signals allows a user greater control of system power consumption as well. For example, a user can save power during subsystem operation by powering off the active regulator, which in turn, powers off the other regulator.

Figure 1:
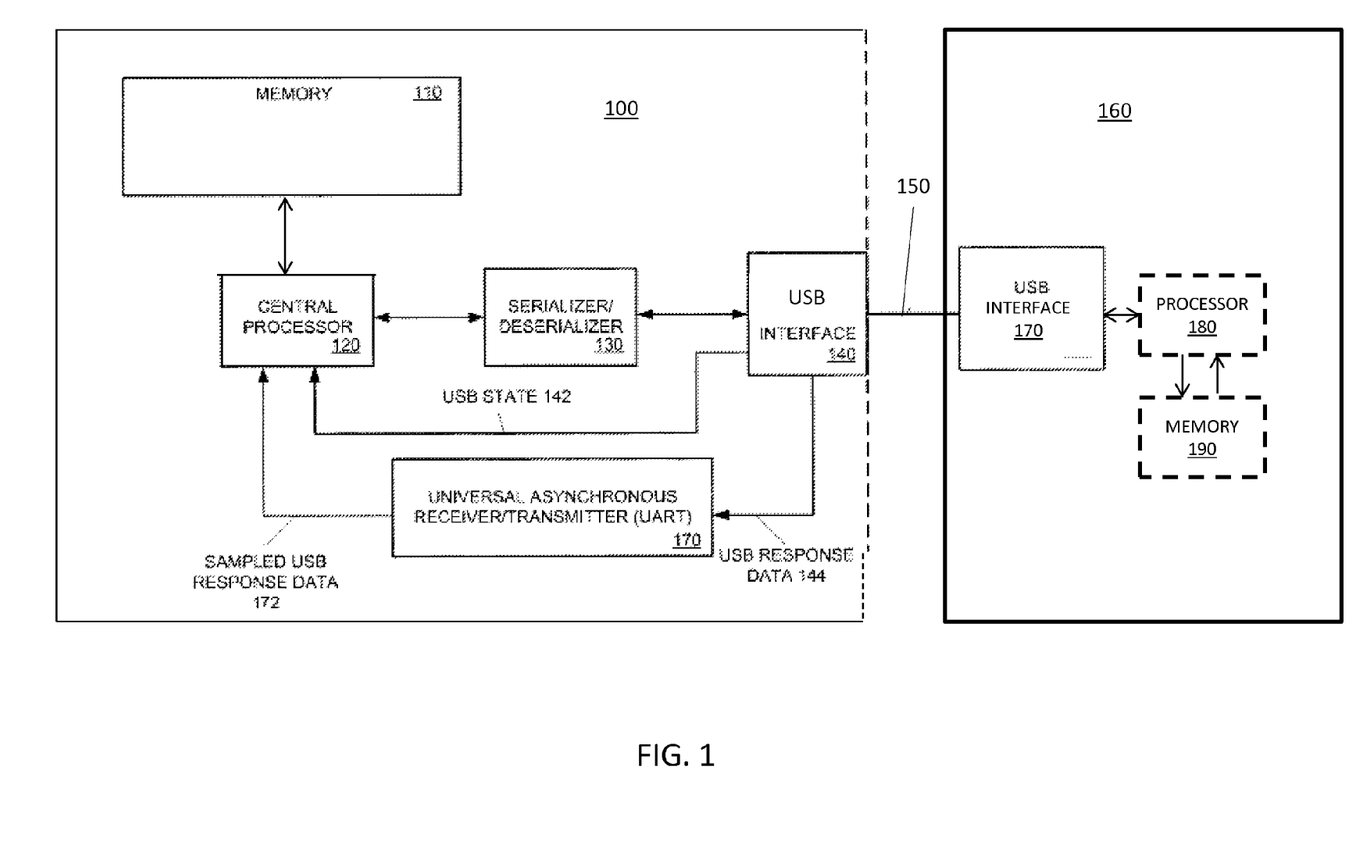
FIG. 1 is a block diagram of a USB host connected to a USB device.

FIG. 1 is a block diagram of a universal serial bus (USB) host system 100 connected to a device 160, according to an embodiment. The USB host system 100 is coupled to the device 160 via a bus 150. The bus 150 may include a USB cable, PCB traces, or other electrical physical connections. In other embodiments, the bus 150 and device 160 are configured to comply with USB 2.0 standards delineated in Universal Serial Bus 2.0 Specification, which may also be found at http://www.usb.org/developers/docs.

The USB host system 100 includes a central processor 120 to control the communication with the device 160 for the USB host system 100. For instance, the central processor 120 may direct the USB host system 100 to issue requests over the bus 150, synchronize with incoming data from the bus 150 by tracking synchronization bits in the incoming data, decode the incoming data, determine whether the incoming data was received correctly, and respond to the incoming data when necessary. In an embodiment, the central processor 120 is a programmed processor (e.g., a central processing unit), hardwired, or fixed-function logic. In other embodiments, the central processor 120 has a different configuration.

The USB host system 100 may be a reduced functionality USB host controller, capable of performing a set of one or more preprogrammed functions from the USB specification. For instance, when the USB host system 100 is incorporated into a host device (such as a cellphone, personal digital assistant, digital cameras, digital video cameras, and the like), the USB host system 100 may include functionality that allows the host device to engage with the device 160 (which may be a mouse, a keyboard, a printer, and the like) via the bus 150. In another example, the USB host system 100 may include functionality that allows the host device to communicate commands to begin operation of the device 160 (such as a printer, a camera, a mouse, printers, scanners, keyboards, joysticks, data acquisition devices, modems, speakers, telephones or video phones, storage devices such as ZIP drives or another peripheral device).

The USB host system 100 includes a memory 110 to store USB data for use in transmissions over the bus 150 to the device 160. This USB data may be generated and stored in memory 110 by the central processor 120 or by another device internal to or external from the USB host system 100. The USB data 115 may have a format that allows the USB host system 100 to transfer the USB data from the memory 110 to the bus 150 without having to perform alterations on the USB data 115.

The USB host system 100 includes a USB physical interface 140 to couple to the bus 150. The USB physical interface 140 may identify when a device (e.g., device 160) is coupled to the USB host system 100 via the bus 150 and provide a USB state 142 to the central processor 120 that indicates the device 160 is coupled to the USB host system 100 via the bus 150.

The central processor 120 may receive USB data from the memory 110, e.g., responsive to the USB state 142, and direct the USB host system 100 to provide the USB data on the bus 150. In some embodiments, the USB data may be a request for the device 160, or may be an acknowledgement of USB response data 144 received from the device 160.

The USB host system 100 includes a serializer/deserializer 130 to perform serialization operations on outgoing data and deserialization operations on data incoming from the bus 150. The USB host system 100 may also include a universal asynchronous receiver and transmitter (UART) 170 to sample USB response data 144 from the device 160. In some embodiments, the central processor 120 or other device in the USB host system 100 may sample USB response data 144 from the device 160. The UART 170 may provide the sampled USB response data 172 to the central processor 120 via the serializer/deserializer 130 for storage and processing.

The device 160 may comprise a USB peripheral device and include a USB physical interface 170. The USB physical interface 170 may indicate when the device 160 is coupled to the USB host system 100 via the bus 150 and provide a USB state that indicates the device 160 is coupled to the USB host system 100 via the bus 150.

Depending on the particular configuration and purpose, the device 160 may include various components for carrying out the operation of the device 160. For example, the device may be an input device, such as a keyboard, pointing device (e.g., mouse, light pen, joystick, touch screen, gaming devices, and the like), imaging device (e.g., a webcam, videocam, scanner, and the like), or an audio device (e.g., microphone) for providing data and control signals to a host system 100 via a device processor 180. Thus, the input device may include buttons, cameras, optical readers, or other components in communication with the device processor 180.

In another example, the device 160 may be an output device that delivers an output to a user resulting from processing completed by the host system 100. For example, the output device may include speakers, headphones, video screen, and the like and may include operational components associated with such devices. Those operational components may be in communication with the device processor 180, in an embodiment.

In other embodiments, the device 160 includes a memory 190, which may include software stored therein for processes that present device configuration data to the USB host system 100 to thereby allow the USB host system 100 to identify the device 160.

Although the processor 180 and memory 190 are depicted in phantom, it will be appreciated that one or both components may be included in the device 160. In other embodiments, additional components, including but not limited to those described above, may also be included as part of the device 160.

Figure 2:
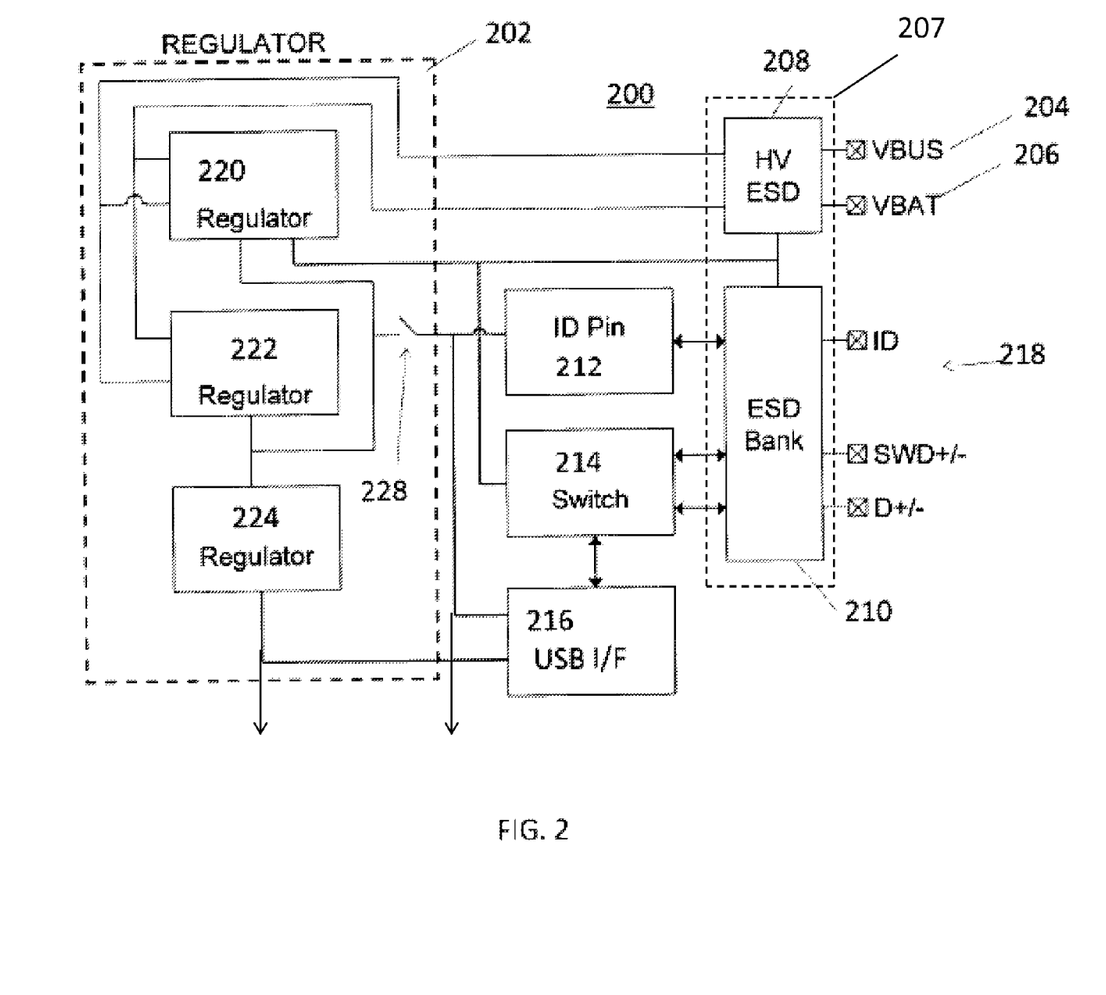
FIG. 2 is a schematic illustrating an embodiment of a USB 2.0 subsystem interface for use in the host or the device of FIG. 1.

FIG. 2 is a functional block diagram of a subsystem 200 that is implemented into the system shown in FIG. 1, according to an embodiment. The subsystem 200 receives power from two independent high-voltage supplies (e.g., VBUS and VBAT) and generates multiple output voltages therefrom for supplying the voltages to components of the subsystem 200. In an embodiment, subsystem 200 includes a regulator module 202, voltage inputs 204, 206, a protection circuit 207, a pin identifier circuit 212, an analog switch 214, a USB physical interface 216, and a power gate 228. The voltage inputs 204, 206 are electrically coupled to the regulator module 202. In an embodiment, the voltage input 204 receives voltage from a battery (VSAT), and the voltage input 206 receives voltage from an external power source (VBUS), such as via a power bus.

The protection circuit 207 includes a first protection circuit 208 and a second protection circuit 210, in an embodiment. The first protection circuit 208 is disposed between voltage inputs 204, 206 and the regulator module 202 to guard from electrostatic discharge. In particular, the first protection circuit 208 is made up of diodes, resistors, and other devices for safe dissipation of the energy associated with an ESD event to thereby prevent damage to the internal circuitry.

The pin identifier circuit 212 and the analog switch 214 are electrically coupled between the regulator module 202 and the second protection circuit 210. The pin identifier circuit 212 is configured to recognize that a device has connected to one of the pins in plurality of pin interfaces 218. In an example, the pin identifier circuit 212 includes resistance detectors for detecting the resistance attached to the ID pin, such as for an accessory charger adapter application, where each specific supported function is associated with a corresponding specific resistance. In another example, the pin identifier circuit 212 is made up of one or more comparators or other components suitable for identifying particular values of resistance. In another embodiment, the pin identifier circuit 212 includes an analog/digital converter that is configured to detect pin resistance. The power gate 228 is disposed between the regulator module 202, the pin identifier circuit 212, and the USB physical interface 216 and is configured receive signals from the controller (not shown) for selective switching between a closed position and an open position. According to an embodiment, the power gate 228 is a PMOS switch or Pfet-type component.

The USB physical interface 216 is electrically coupled to the regulator module 202 and the analog switch 214. USB physical interface 216 can be a host interface (e.g., USB physical interface 140) or a device interface (e.g., USB physical interface 170). It will be appreciated that the USB physical interface 216 is an on-die component (e.g., a chip) that is included as part of the subsystem 200. In another embodiment, an external USB physical interface is additionally available to the subsystem 200 as an external device and thus, may be connected to the subsystem 200 via a pin included on or connected to a pin interface of the plurality of pin interfaces 218. In an embodiment, the USB physical interface 216 and external USB physical interface are compatible with USB 2.0 and earlier protocols. The plurality of pin interfaces may include D+, D−, SW+, SW−, or other ID pin interfaces.

The analog switch 214 selectively allows passage of a signal from the external USB physical interface (e.g., D+/− 218) to either the USB physical interface 216 or a separate set of external pins. In an embodiment, the analog switch 214 is configured to selectively allow high speed traffic flow to one or both of the USB physical interfaces. The analog switch 214 is a circuit or is made up of a plurality of components suitable for isolating various signals communicated to and from one or both of the USB physical interface 216 or external set of pins (e.g., SWD+/− 218).

The second protection circuit 210 dissipates energy associated with an electrostatic discharge event that may occur when one or more devices are connected to one or more pin interfaces of the plurality of pin interfaces 218. The second protection circuit 210 is configured substantially similar to the first protection circuit 208. It will be appreciated that although the protection circuit 207 is shown as including two separate protection circuits 208, 210, those with skill in the ordinary art will recognize that the protection circuit 207 alternatively can be made up of a single circuit or more than two separate circuits.

To provide multiple power outputs to operate the subsystem 200, the regulator module 202 is implemented as a dual power supply regulator configured to constantly make available a first voltage output and to selectively supply additional switched voltage outputs. In an example, the regulator module 202 includes a first or standby regulator 220, a second or active regulator 222, and a third or auxiliary regulator 224. The standby regulator 220 receives power from one or both of the voltage inputs 204, 206 to provide a continuous supply of the first voltage to the protection circuit 207 and to the analog switch 214. In a particular embodiment, the standby regulator 220 provides the first voltage to a high voltage protection circuit 208 of the protection circuit 207 and an electrostatic discharge (ESD) bank protection circuit 210 of the protection circuit 207. The high voltage protection circuit 208 has diodes that absorb electrostatic discharge in an electrical surge event, which may occur if one or both of the voltage inputs 204, 206 supplies an amount of power that exceeds a threshold voltage. The ESD bank protection circuit 210 has diodes that absorb electrostatic discharge resulting from a power surge that may occur when a device connected to the subsystem 200 via the plurality of pin interfaces 218 supplies an amount of power that exceeds a threshold voltage. By providing an "always on" amount of power to the high voltage protection circuits 208, high voltage cascode protection is provided. The "always on" power provides power supply independence to the ESD bank 210.

According to an embodiment, the standby regulator 220 is configured to provide a first voltage of 3.3V. In other embodiments, the first voltage is another amount of power that is suitable for powering the protection circuits 208, 210 and the analog switch 214.

The active regulator 222 is electrically connected to the voltage inputs 204, 206. In an embodiment, the active regulator 222 receives voltage from the voltage inputs 204, 206 and the standby regulator 222. The active regulator 222 outputs the received voltage as a second voltage to the pin identifier circuit 212, the USB physical interface 216, and the auxiliary regulator 224. In one example, the second voltage is about 3.3 V. In another embodiment, the second voltage is more or less than 3.3V. In another example, the second voltage is substantially equal to the first voltage. The auxiliary regulator 224 supplies a portion of the second voltage (i.e., a third voltage) to the USB physical interface 216. According to an embodiment, the third voltage is substantially equal to about 2.5 V. In another embodiment, the third voltage is more than or less than 2.5 V. Both the active regulator 222 and the auxiliary regulator 224 are configured to be selectively switched between a power on and a power off mode. Specifically, the active and auxiliary regulator 222, 224 receive signals from a controller (not shown) to switch to one of the desired modes.

As briefly noted above, the subsystem is configured to allow a user to control voltage amounts being supplied to components to thereby save power. During operation, when the subsystem 200 is used in a standby mode, the active regulator 222 and, in some cases, the auxiliary regulator 224 each receive a signal from the controller to power off. The power gate 228 disposed between the active regulator 222, the pin identifier circuit 212, and the USB physical interface 216 is closed or open. Accordingly, the standby regulator 220 continues to supply the first voltage to the protection circuits 208, 210 and the analog switch 214. With the active regulator 222 and the auxiliary regulator 224 turned off, voltage is not supplied to the pin identifier circuit 212 or the USB physical interface 216.

When operation of the pin identifier circuit 212 and/or the USB physical interface 216 are desired, the controller sends a signal to the active regulator 222 to power on. In this regard, the standby regulator 220, which is always on and continuously outputs power, aids in the startup of the active regulator 222 with the first voltage. The power gate 228 disposed between the active regulator 222, the pin identifier circuit 212, and the USB physical interface 216 receives a signal to switch to closed. Consequently, the active regulator 222 generates the second voltage to energize the pin identifier circuit 212 and the USB physical interface 216. As a result, the pin identifier circuit 212 can detect pin resistance to recognize device connection to one or more of the plurality of pin interfaces 218.

In other embodiments, the subsystem 200 may operate in a high power mode, where an additional third voltage is supplied to the USB physical interface 216. In an embodiment, the auxiliary regulator 224 receives a control signal to power on, and the second voltage generates a third voltage that is outputted to the USB physical interface 216. Providing power from both the active and auxiliary regulators 222 allows the subsystem to provide an optimum amount of power at the USB physical interface 216.

In still another embodiment, operation in an intermediate power mode is desired. In such case, the active and auxiliary regulators 222, 224 receive control signals to power on, except the power gate 228 disposed between the active regulator 222, the pin identifier circuit 212, and the USB physical interface 216 receives a signal to switch from closed to open. As a result, the second voltage from the active regulator 222 is prevented from being supplied to the pin identifier circuit 212 and the USB physical interface 216, but continues to be supplied to the auxiliary regulator 224 which generates and provides the third voltage to the USB physical interface 216. The second and third voltages may be used by other circuits not shown in FIG. 2.

Figure 3:
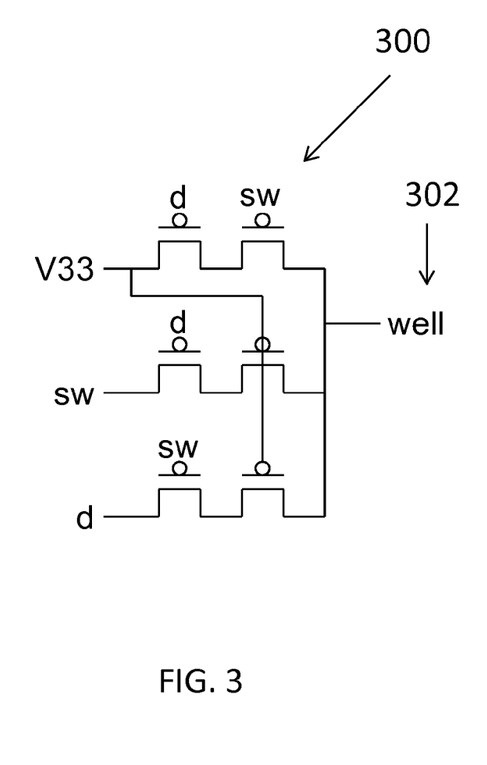
FIG. 3 is an n-well control circuit for implementation with an analog switch.
Figure 4:
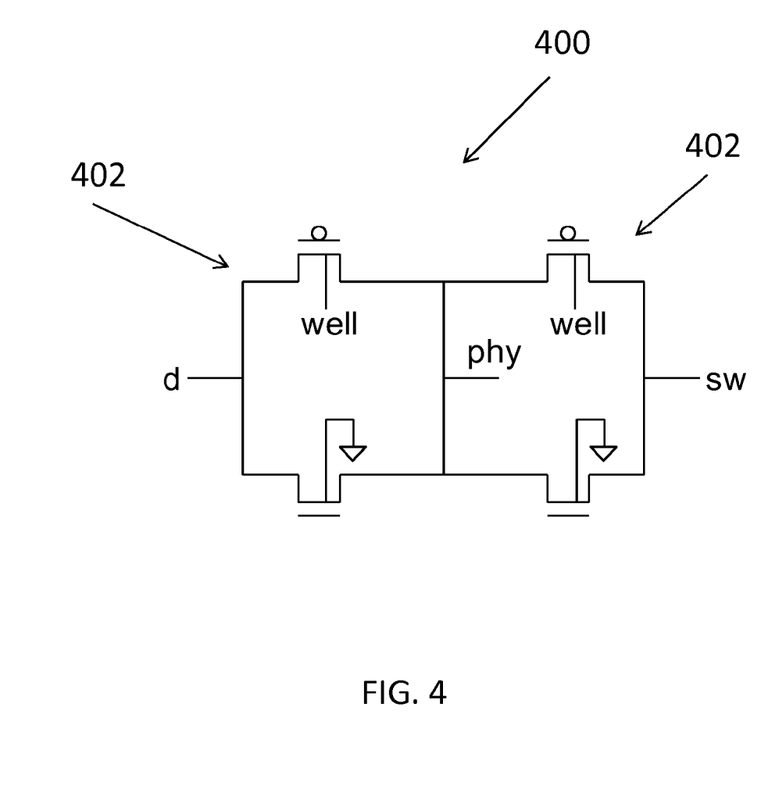
FIG. 4 is a CMOS analog switch.

Continuously supplying a weak power supply voltage to the protection circuit 210 cuts off potential pin leakage paths through the regulator module 202, as described previously. Additionally, including controlled n-well circuitry as part of the analog switch 214 limits pin leakage. FIG. 3 is an n-well control circuit 300 for implementation in the analog switch 214 and FIG. 4 is an illustration of a CMOS analog switch 400, according to an embodiment. As illustrated in FIGS. 3 and 4, the n-well control circuit 300 is configured such that a highest voltage in the n-well control circuit 300 is outputted to the n-well node 302. The outputted voltage drives the bulk pins of PMOS transistors 402 that form part of the CMOS analog switch 400. Additionally, circuitry driving the CMOS gates choose the highest voltage (now shown). As a result, the PMOS transistors 402 are maintained in an off state so that no leakage occurs from external pins for any combination of external pin voltages and internal supply voltages.

Figure 5:
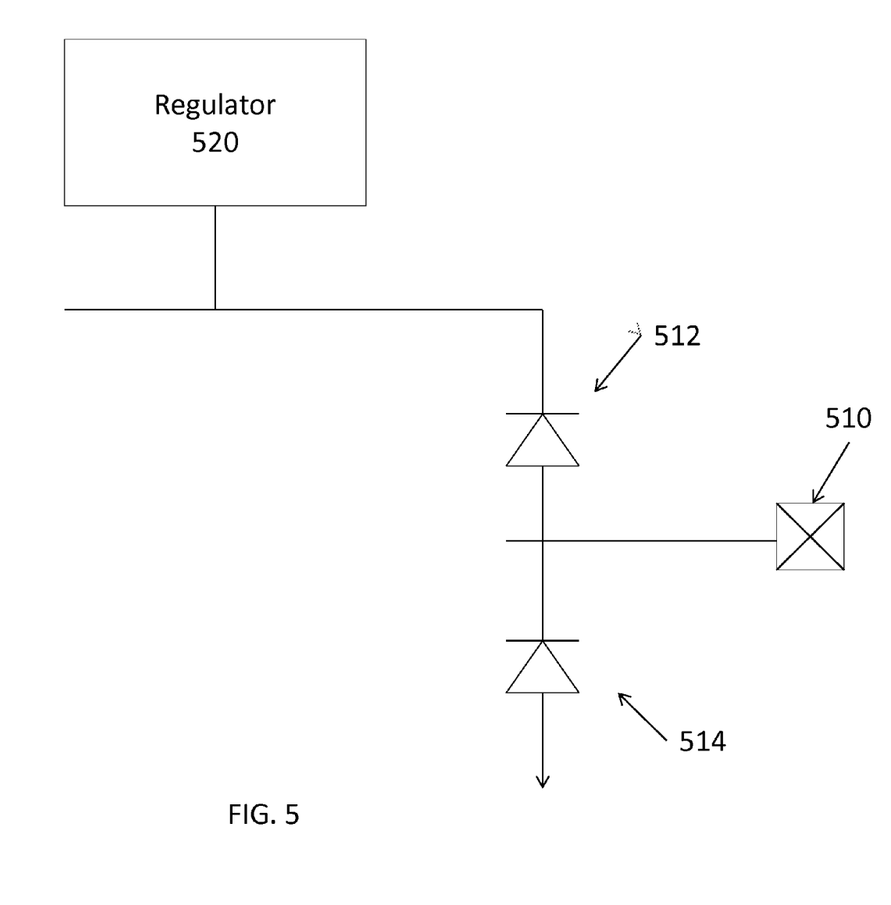
FIG. 5 is a detailed schematic illustrating a connection between a regulator and a pin interface for use in the USB 2.0 subsystem interface of FIG. 2.

Turning to FIG. 5, if a voltage is applied to one or more of the pins at the external interfaces 510 that is greater than the internal supply voltage, the internal supply voltage is pulled up to the level of the external pin voltage by parasitic diodes 512, 514 in the protection circuit due to the connection of the internal supply voltage to the standby regulator 520. For example, in an embodiment in which standby regulator 520 supplies an always on voltage supply of 3.3V, when the voltage at the pins at the external interfaces 510 is greater than 3.3V, the temporary pin leakage causes the 3.3V always on supply to be pulled up to the amount of voltage at the external interfaces 510. As a result, pin leakage is cut off in steady state and the pins are free of any voltage restrictions within the specification range. The subsystem can be built as part of a system including a host system or a device, where the other end of the link is incorporated into a host or another device.

Figure 6:
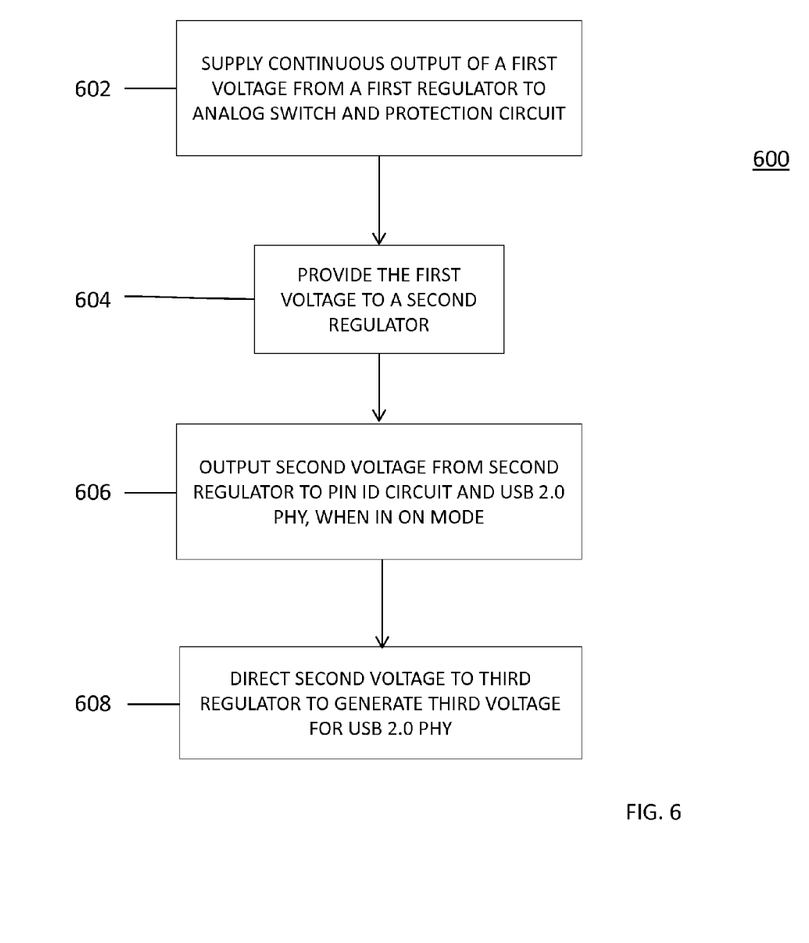
FIG. 6 is a flow diagram of a method of operating a USB 2.0 subsystem interface.

FIG. 6 is a flow diagram of a method 600 of operating a USB 2.0 physical layer subsystem, according to an embodiment. At 602, a continuous output of a first voltage from a first regulator (e.g., regulator 220) is supplied to an analog switch (e.g., switch 214) and a protection circuit (e.g., protection circuit 209). The protection circuit 209 includes a plurality of pin interfaces (e.g., interfaces 218). At 604, the first voltage is provided to a second regulator (e.g., regulator 222). The second regulator is configured to be switched between an on mode and an off mode.

At 606, a second voltage from the second regulator is outputted to be supplied to a pin identifier circuit (e.g., pin identifier circuit 212) and a USB 2.0 physical interface (e.g., interface 216), when the second regulator is in the on mode. In another embodiment, a switch (e.g., switch 228) disposed between the second regulator, pin identifier circuit, and the USB 2.0 physical interface is switched between an on mode and an off mode, where the on mode supplies the second voltage to the pin identifier circuit and the USB 2.0 physical interface, and the off mode shuts off supply of the second voltage to the pin identifier circuit and the USB 2.0 physical interface.

The second voltage is directed to a third regulator (e.g., regulator 224) to generate a third voltage to be supplied to the USB 2.0 physical interface at 608. In this regard, a signal is provided to the second regulator to switch to an off mode to prevent the third regulator from receiving the second voltage. The third regulator is configured to switch between on and off modes and another signal is provided to the third regulator to switch to the off mode to prevent generation of the third voltage. In an embodiment, the third voltage is less than the second voltage.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A USB physical layer subsystem comprising:
a protection circuit including a power supply interface and a plurality of pin interfaces;
a pin identifier circuit in communication with the protection circuit for detecting a device coupling to a pin connected to a pin interface of the plurality of pin interfaces;
a USB physical interface; and
a dual power supply regulator including a first regulator, a second regulator, and a third regulator, the dual power supply configured to receive power via the power supply interface from an external power supply, to continuously supply a first voltage to the protection circuit, and to selectively provide a second voltage and a third voltage to the pin identifier circuit and the USB physical interface, wherein the second regulator is configured to supply the second voltage to the third regulator.

2. The USB physical layer subsystem of claim 1, wherein:
the dual power supply regulator is further configured to operate and receive power from a first input power supply and the external power supply.

3. The USB physical layer subsystem of claim 1, wherein the first regulator supplies the first voltage to the second regulator, and the second regulator is configured to be selectively powered on and powered off.

4. The USB physical layer subsystem of claim 3, wherein the third regulator supplies the third voltage, and the third regulator is configured to be selectively powered on and powered off.

5. The USB physical layer subsystem of claim 3, wherein the USB physical interface is in communication with the second regulator.

6. The USB physical layer subsystem of claim 3, further comprising a switch disposed between the second regulator and the USB physical interface and between the second regulator and the pin identifier circuit.

7. The USB physical layer subsystem of claim 1, further comprises an analog switch in communication with the protection circuit and the dual power supply regulator and configured to receive the first voltage from the dual power supply regulator.

8. The USB physical layer subsystem of claim 7, wherein the analog switch is configured to selectively allow traffic flow from two pins of the plurality of pin interfaces to the USB physical interface.

9. The USB physical layer subsystem of claim 7, wherein the analog switch is configured to selectively allow signal flow from a first set of two pins of the plurality of pin interfaces to a second set of two pins of the plurality of pin interfaces.

10. The USB physical layer subsystem of claim 1, wherein the pin identifier circuit comprises an analog/digital converter (ADC).

11. The USB physical layer subsystem of claim 10, wherein the ADC is configured to detect pin resistance.

12. A method of operating a USB physical layer subsystem comprising:
   using an external power supply, supplying a continuous output of a first voltage from a first regulator to an analog switch and a protection circuit in communication with a plurality of pin interfaces;
   providing the first voltage to a second regulator configured to be selectively powered on and powered off;
   generating a second voltage by the second regulator to be supplied to a pin identifier circuit and a USB physical interface, when the second regulator is powered on;
   directing the second voltage to a third regulator to generate a third voltage to be supplied to the USB physical interface, when the second regulator is powered on; and
   selectively powering off the second regulator to prevent the second regulator from generating the second voltage.

13. The method of claim 12, wherein the third voltage is less than or equal to the second voltage.

14. The method of claim 12, further comprising providing a signal to the second regulator to power off the second regulator to prevent the third regulator from receiving the second voltage.

15. The method of claim 12, wherein the third regulator is configured to be selectively powered on and powered off and the method further comprises providing a signal to the third regulator to power off the third regulator to prevent the third regulator from generating the third voltage.

16. The method of claim 12, further comprising switching a switch disposed between the second regulator, the pin identifier circuit, and the USB physical interface between an open mode and a closed mode, the closed mode supplying the second voltage to the pin identifier circuit and the USB physical interface, and the open mode shutting off supply of the second voltage to the pin identifier circuit and the USB physical interface.

17. The method of claim 12, further comprising:
   receiving an external pin voltage that is greater than an internal supply voltage; and
   pulling the internal supply voltage up to the external pin voltage through parasitic diodes in the protection circuit to reduce pin leakage.

18. A USB physical layer subsystem for use with a USB device comprising:
   a protection circuit in communication with a plurality of ID pin interfaces;
   an analog switch in communication with the protection circuit;
   a USB physical layer interface in communication with the analog switch;
   a first voltage supply regulator adapted to receive power from one or more power sources and configured to use an external power source to provide a continuous supply of a first voltage to the protection circuit and the analog switch;
   a second voltage supply regulator electrically coupled to the first voltage supply regulator and configured to receive power from the one or more power sources and to generate a second voltage for the USB physical layer interface, the second voltage supply regulator adapted to be selectively powered on and powered off; and
   a third voltage supply regulator electrically coupled to the second voltage supply regulator and configured to receive power therefrom and to provide a portion of the second voltage to the USB physical layer interface, wherein:
   the second voltage supply regulator is configured to be selectively powered on to supply the second voltage to the USB physical layer interface when the USB subsystem is in a high power mode, and
   the second voltage supply regulator is selectively powered off to shut off supply of the second voltage to the USB physical layer interface when the USB subsystem is in a low power mode.

19. The USB physical layer subsystem of claim 18, wherein:
   the third voltage supply regulator is adapted to be selectively powered on and off, and
   when the third voltage supply regulator is powered on and the second voltage supply regulator is turned on, a portion of the second voltage is provided to the USB physical layer interface.

20. The USB physical layer subsystem of claim 18, further comprising a resistance detector in communication with the second voltage supply regulator and the protection circuit.

* * * * *